United States Patent
Jafri et al.

(10) Patent No.: US 8,781,998 B2
(45) Date of Patent: Jul. 15, 2014

(54) WORKFLOW AUTOMATION SYSTEM AND METHOD

(71) Applicant: King Fahd University of Petroleum and Minerals, Dhahran (SA)

(72) Inventors: Syed Shomaail Monsoor Jafri, Dhahran (SA); Yasser Shabaan, Redmond, WA (US); Sahel Nashat Abduljauwad, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 6 days.

(21) Appl. No.: 13/736,022

(22) Filed: Jan. 7, 2013

(65) Prior Publication Data
US 2013/0124254 A1 May 16, 2013

Related U.S. Application Data

(63) Continuation-in-part of application No. 12/591,124, filed on Nov. 9, 2009, now abandoned.

(51) Int. Cl.
G06F 17/30 (2006.01)
(52) U.S. Cl.
USPC .......................................... 707/608
(58) Field of Classification Search
CPC ......... G06Q 10/10; G06Q 10/06; G06F 17/30
USPC ......... 707/608, 802, E17.005, 999.01; 705/9, 705/7.13, 7.15, 7.21, 7.26, 7.27; 709/203, 709/206; 715/234
See application file for complete search history.

(56) References Cited

U.S. PATENT DOCUMENTS

| | | | |
|---|---|---|---|
| 5,864,871 A | 1/1999 | Kitain et al. | |
| 6,157,934 A | 12/2000 | Khan et al. | |
| 6,668,281 B1 | 12/2003 | Ayyadurai | |
| 6,789,047 B1 | 9/2004 | Woodson | |
| 6,810,383 B1 | 10/2004 | Loveland | |
| 7,526,409 B2 | 4/2009 | Ramacher et al. | |
| 2002/0103737 A1 | 8/2002 | Briere | |
| 2006/0218034 A1 | 9/2006 | Kelly | |
| 2007/0245184 A1 | 10/2007 | Benfield et al. | |
| 2008/0114668 A1 | 5/2008 | Peters et al. | |
| 2008/0229214 A1 | 9/2008 | Hamilton et al. | |
| 2008/0270181 A1 | 10/2008 | Rosenberg | |

FOREIGN PATENT DOCUMENTS

WO  WO 03012660 (A1)  2/2003

OTHER PUBLICATIONS

"Instant Writeups"; http://www.abacalab.com/writeup.html; printed Jun. 9, 2009, 1 page.

*Primary Examiner* — Ajay Bhatia
*Assistant Examiner* — Randall Burns
(74) *Attorney, Agent, or Firm* — Richard C. Litman (57) ABSTRACT

The workflow automation system is a secure, online web-based system that automates any office workflow in a minimal amount of time by providing appropriate customizations and ASP.net forms, the customizations including name of the system, task-names, role names, names of actions on each task, order of tasks, etc. After the customizations, the workflow automation system is executable to provide each role a secure login with a central HR repository; an application that the role is responsible for; active task(s) in the application, etc. The desired web forms can be made in ASP.net using provided templates for forms, and controls to define what to do when by whom. The workflow automation system includes automatic sending of e-mail reminders to complete tasks after certain administrator-defined intervals, application tracking, parallel and sequential task processing, easy concealment of certain role names from others, and an easy method to provide Instructions on each web page.

14 Claims, 6 Drawing Sheets

WORKFLOW AUTOMATION SYSTEM AND METHOD

CROSS-REFERENCE TO RELATED APPLICATION

This application is a continuation-in-part of U.S. patent application Ser. No. 12/591,124, filed Nov. 9, 2009.

BACKGROUND OF THE INVENTION

1. Field of the Invention

The present invention relates to workflow automation, and more specifically to a workflow automation system and method that includes a secure online web-based system that efficiently automates any office workflow.

2. Description of the Related Art

With the decrease in the price of computer hardware, businesses all round the world are tending to adopt automation of business workflow and avoiding primitive paper based systems. This is due to the apparent advantages like security, alacrity, enhanced management etc. over the paper-based system. Since business workflows are of different types, complexity and nature, a need for a customizable engine is observed that can come up with automation of any workflow. Although, the proposed workflow automation system is not a complete solution but rather to some extent, it can produce automation of any office or business workflow quite easily.

A workflow is simply an ordered series of tasks that accomplish some defined purpose according to a set of rules. There are different types of workflow with respect to the task order. In some workflows, all of the tasks are assigned to roles one after the other, i.e., in a sequential manner. Other workflows have some tasks in parallel and others sequential. Some workflows handle the series of tasks in a forward-only manner, while others handle tasks in a back and forth manner. Hence, different workflow schemes have different complexities and rules.

There have been a number of efforts to automate workflows for the last two decades. The automated workflow systems keep changing with the change in the requirements and environment in the offices.

One of the early approaches for developing automation of workflow is Document Management System (DMS). DMS is a computer system (or set of computer programs) used to track and store electronic documents and/or images of paper. Initially, it was used only for storing and managing paper documents and was typically known for storage of scanned documents and images in electronic form on a server. However, DMS has matured from a basic archival and retrieval system to a complete information management solution. It is now used for making work flow. While DMS has kept on improving continuously over time, flexibility in making complex workflow schemes remains limited. Moreover, DMS is incapable of making complex forms and hiding chunks of information from specified roles (e.g., hiding names of members of a certain committee in a document). Additionally, attempts at workflow automation have not provided a complete general solution, which is needed.

Enterprise Resource Planning (ERP) has been suggested for a complete general solution for entire business process automation. However, ERP is high in cost, not especially suitable for small businesses, and limited in ERP software customization.

Thus, a workflow automation system and method solving the aforementioned problems is desired.

SUMMARY OF THE INVENTION

The workflow automation system and method includes a secure online web-based system that automates any office workflow in a minimal amount of time by providing appropriate customizations and ASP.net forms, the customizations including: name of the system, task-names, role names, names of actions on each task, order of tasks, etc. After the customizations, the workflow automation system is executable to provide each role with a secure login having a central HR repository; an application the role is responsible for; active task(s) in the application, etc. Subsequently, the desired web forms can be made in ASP.net using the provided templates for forms and controls to define what to do, when, and by whom. The workflow automation system includes automatic sending of e-mail reminders to complete tasks after certain administrator-defined intervals, application tracking, parallel and sequential task processing, easy concealment of certain role names from others, and an easy method to provide Instructions on each web page.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 3:
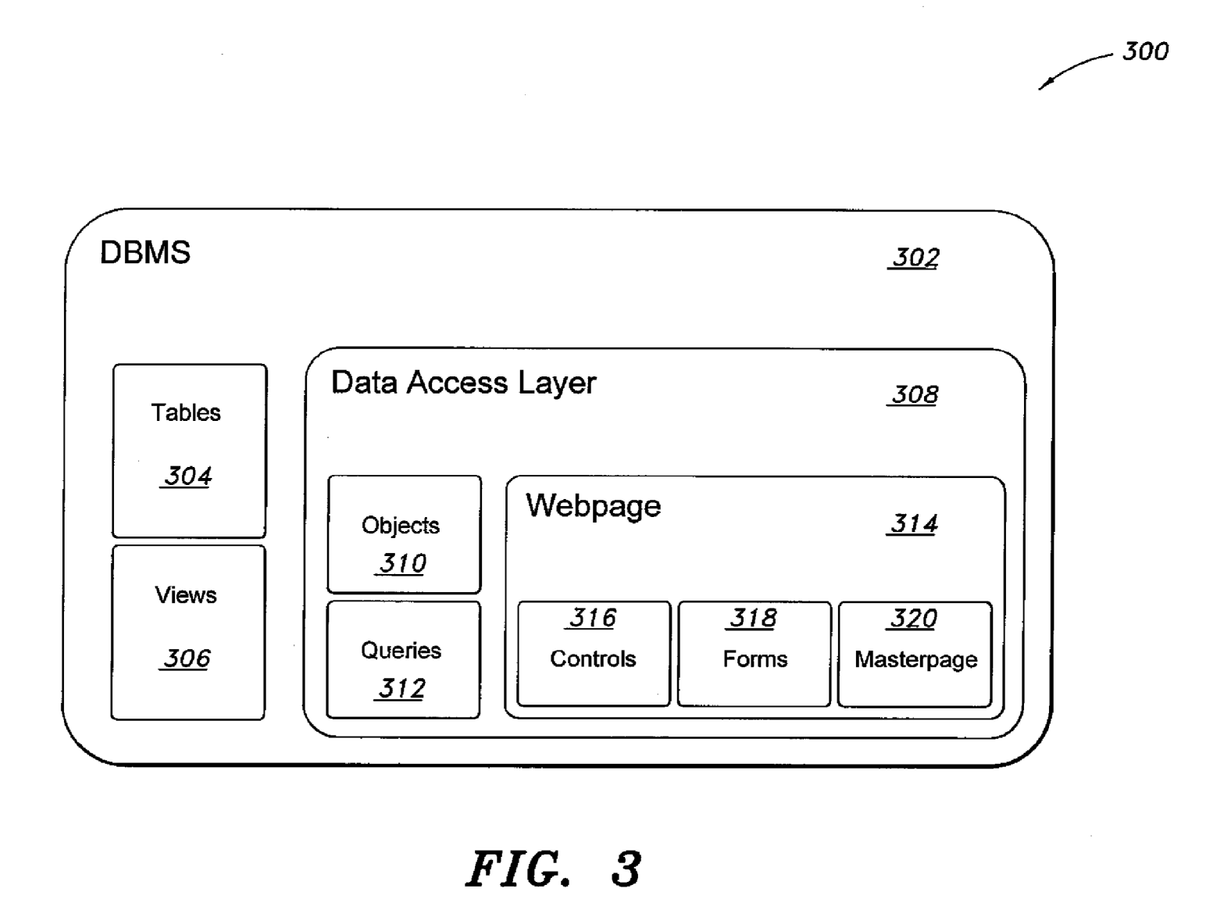
FIG. 3 is a block diagram illustrating processing layers in a workflow automation system according to the present invention.
Figure 5:
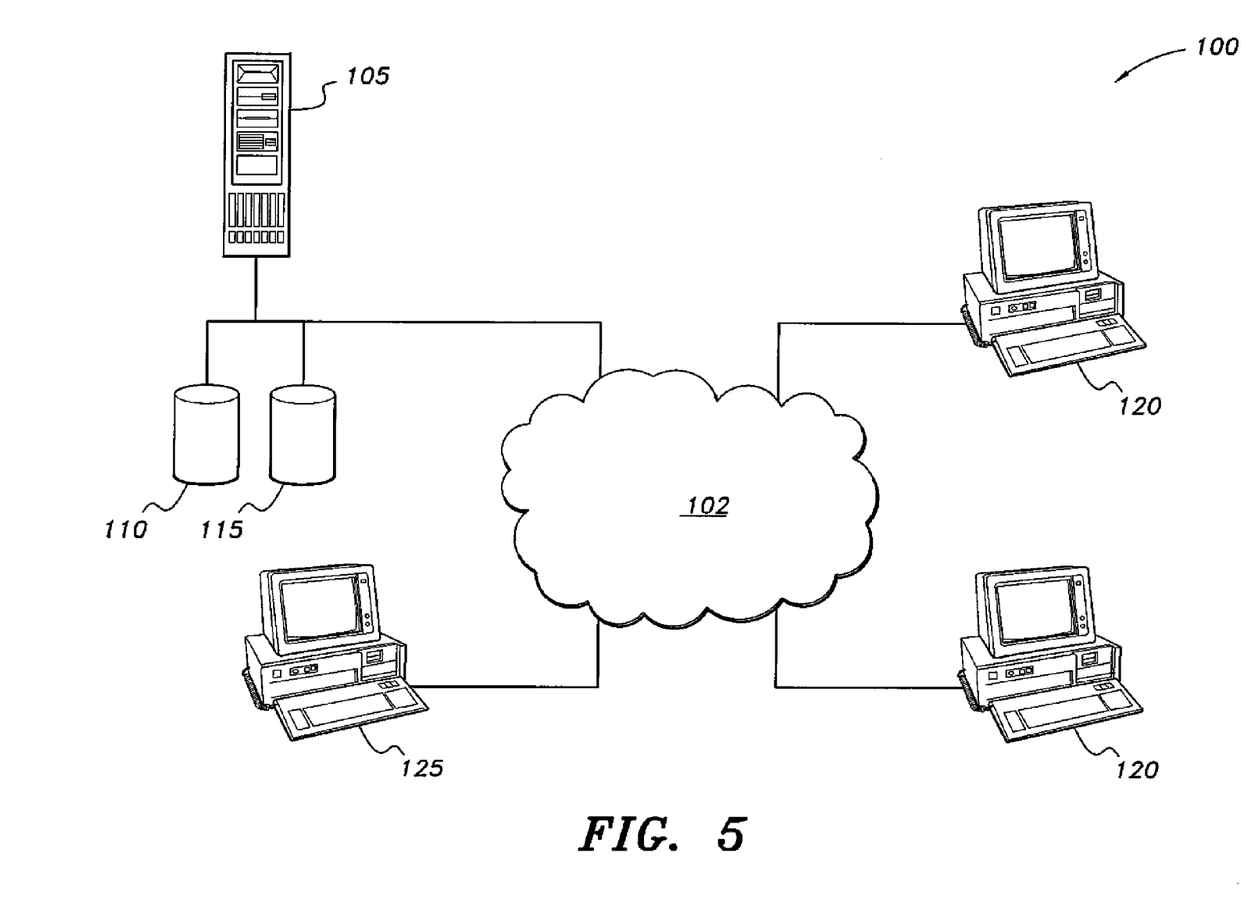
FIG. 5 is a typical processing environment for a workflow automation system and method according to the present invention.

As shown in FIGS. 3 and 5, the workflow automation system 300 can produce a secure online web-based system 100 to automate any office workflow in a minimal amount of time by providing appropriate customizations and ASP.net forms, the customizations: including name of the system, task-names, role names, names of actions on each task, order of tasks, etc. FIG. 5 shows an exemplary computing environment 100 that the workflow automation system 300 can run in. Exemplary server 105 hosts web pages stored on mass storage device 110 and hosts a DBMS having access to databases stored on mass storage device 115. While a single server platform 105 is shown, the workflow automation system 300 can be distributed across multiple networked servers. Similarly, web page storage and database storage may be accomplished via a plurality of mass storage devices, such as MSU's 110 and 115, in a variety of configurations. User devices 120 access the web pages via the Internet 102. Administrator device 125 accesses administrative functions related to web page development and DBMS maintenance via the Internet 102.

After the customizations, the workflow automation system 300 is executable to provide each role with a secure login having a central HR repository; an application that the role is responsible for; active task(s) in the application, and the like. Subsequently, the desired web forms can be made in ASP.net using the provided templates for forms and controls to define what to do, when, and by whom; i.e., the business logic of the workflow and tasks. The workflow automation system includes automatic sending of e-mail reminders to complete tasks after certain administrator-defined intervals, application tracking, parallel and sequential task processing, easy concealment of certain role names from others, and an easy method to provide Instructions on each web page.

The workflow automation system is a framework for building automation of workflows. It provides user-friendly forms for providing information, such as the name of the system, Tasks, Roles, and Action, etc. This information is further used for defining the workflow. Once the workflow is constructed, Forms can be made using the available templates for defining specifically the task for every role. These Forms are preferably made in ASP.net 2.0. The system facilitates the roles performing tasks by automatically sending e-mail reminders to complete tasks after a certain administrator-defined interval. The system facilitates users to see the tracking information of all the tasks present in the workflow, with the task names, person name, and role name and the time of action, along with the duration each role is taking.

With some easy adjustment in defining Task and Action while building the automation, tasks can be made which can be ordered sequentially as well as in parallel. This feature allows complex workflow requirements to be automated with ease. The roles present in the system are shown information only relevant to them. The administrator can show and hide any chunk of information in the dynamic reports from one role to the other with the help of available forms while defining the system. Apart from this, the names of people performing actions in the Action History can also be hidden for unwanted roles. The system provides a user-friendly graphical user interface (GUI) for the administrator to add/edit instructions present on each web page.

The workflow automation system helps the user to make logical workflow of any business or office system. The procedure follows some known steps. However, before describing the system itself, there are some minor preliminary requirements that need to be fulfilled. These requirements are described below, followed by the steps for building the automation and running of the automation.

The workflow automation system is meant to automate businesses with an established e-mail system and a central repository of employee details and department organization. The employee detail must include ID, Name, Department, and employee's e-mail ID (organization e-mail). The Department organization must contain the list of all departments with their Department Heads' employee IDs. If such a repository is not present then the system provides forms for making the repository. However, the e-mail system is a necessary pre-requisite of the workflow automation system. The steps for making an automation system are described below. Forms are provided to complete each step in the workflow automation system with the administration login.

The system is defined by three fields, namely: System Full Name, System Short Name, and Complete URL. The full name appears on each web page as a title and in the Footnote, whereas the short name is used for the system e-mail ID (e.g., ABCSystem@organization.com, where "ABCSystem" is the short name of the system).

Every role is assigned a Role ID, a Role Name and a Level in organization hierarchy. A higher level denotes a higher level in the organization hierarchy. For example, the level of a staff member is less than the level of his immediate boss and so on. The levels can be the same as well.

A Phase is defined by a Phase ID and Phase Title. If two tasks are defined to be run in parallel, then each has the same phase ID. Each task is assigned a Task ID, a Phase ID, a Task Title, the Role ID of the role the task is assigned to, first reminder duration (in days) and Second and later reminders duration (in days).

Figure 1:
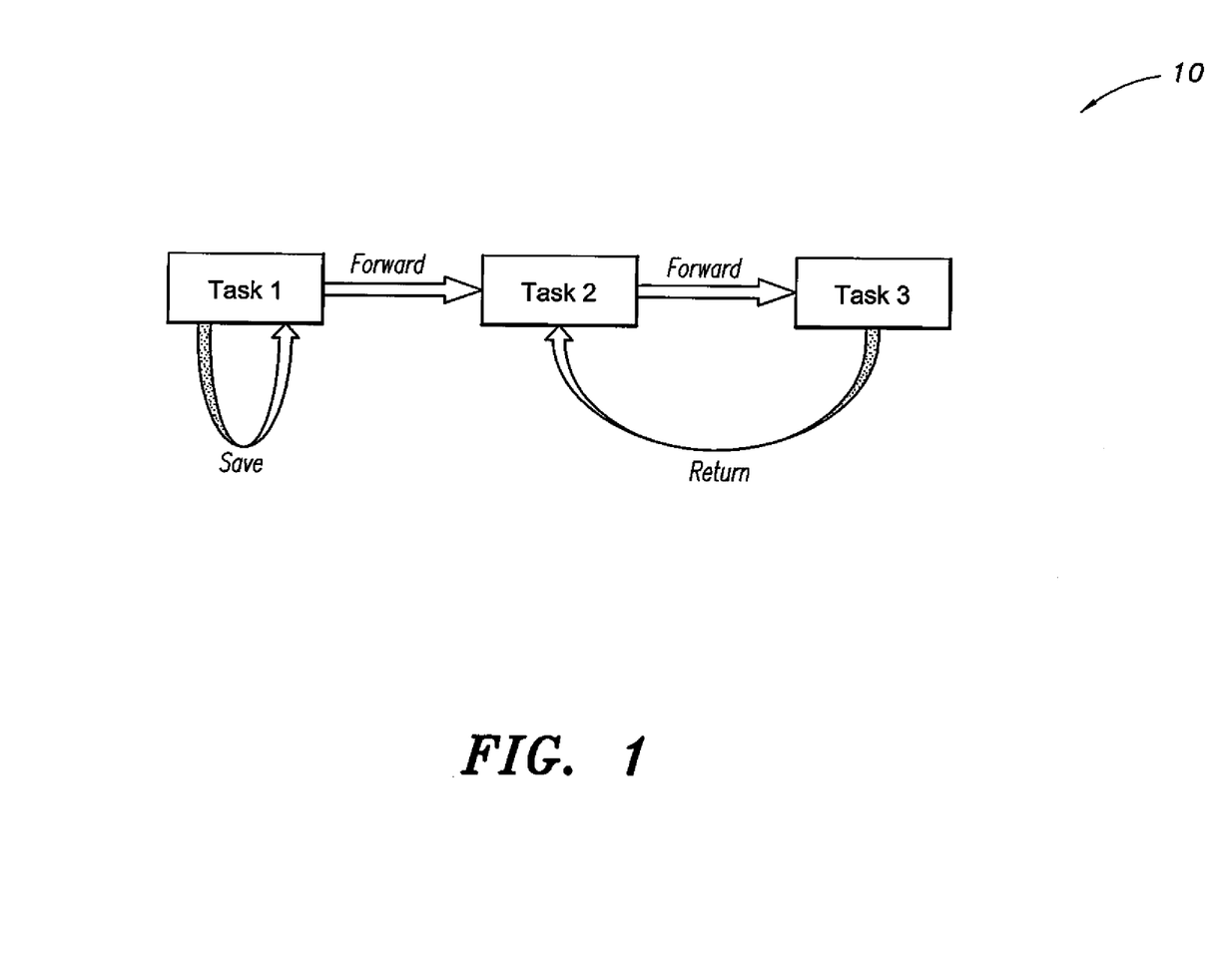
FIG. 1 is a block diagram showing a typical order of tasks in a workflow automation system according to the present invention.
Figure 2:
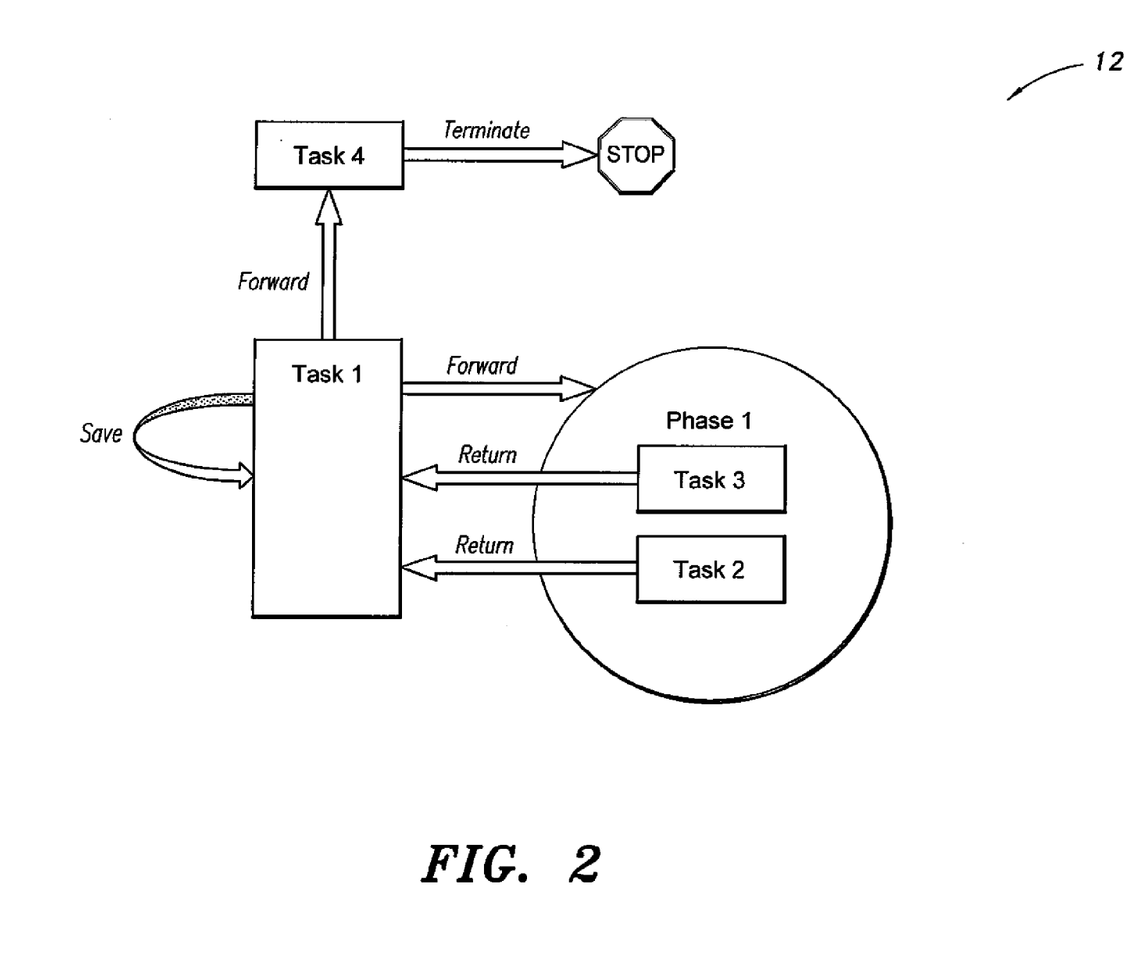
FIG. 2 is a block diagram showing diverging and converging tasks in a workflow automation system according to the present invention.

As shown in FIG. 1, tasks 10 may have a forward progress from task to task, including a "Save" loop and a "Return" (i.e., a feedback loop to a previous task). As shown in FIG. 2, tasks 12 may be converging, as between exemplary tasks 1, 2 and 3, or the tasks may be diverging, as between exemplary tasks 1 and 4. Every action related to a task is defined by an Action ID, Action Title, Action Type, Task ID of the task holding the action and either a next Task ID or a next Phase ID. A phase ID is used when the action forks into more than one parallel task. Action Type is a set of some pre-defined actions that a role can take when assigned a task. These include: Forward, Return, Save, Terminate, etc. The Action may lead the role to complete the task (e.g., Save), initiate a new task (e.g., Forward), return to the previous task (e.g., Return) or finish the workflow (e.g., Terminate).

Each form is defined by a Form ID, the title of the page and the name of an ASP.net form (along with extension ".aspx"). A "task" is a set of forms assigned to a role present in the system. The names of each form appear as menu items in the left pane when the task is opened by the user. Some forms are necessary to be filled and saved by the user and others are optional. Each task is defined with the Task ID, Form ID, the rank/position of the form name in the menu, a level (which represents some privileges when a single form is to be shown to two different roles), Instructions that appears on the top of each form and a Boolean field representing that the form is necessary or optional for the completion of the task.

When a task is completed with a start of another task, an e-mail is sent to the role associated with the next tasks. The e-mail template for this e-mail is to be defined here. It is defined by an Action ID, the next Task ID, and the message. In Table 1 below, the variables that can be used in the template are described. Their values are fetched at run time.

TABLE 1

E-Mail Templates

| S. No. | Variable in E-mail Templates | Description |
| --- | --- | --- |
| 1 | @@Applicant@@ | The initiator of the request/application in the workflow |
| 2 | @@ApplicantDepartment@@ | Applicant's Department Name |
| 3 | @@Receiver@@ | The Name of the Person responsible for the next task |
| 4 | @@ReceiverDepartment@@ | Receiver's Department Name |

TABLE 1-continued

E-Mail Templates

| S. No. | Variable in E-mail Templates | Description |
|---|---|---|
| 5 | @@Sender@@ | The Name of the Person responsible for the Current Task |
| 6 | @@SenderDepartment@@ | Sender's Department Name |

With the aforementioned eight steps, the skeleton of the workflow is complete. The workflow can now be accessed on the URL. The forms now need to be constructed using the available ASP.net Forms and Controls templates.

The workflow automation system 300 is designed to provide a secure web-based automation of workflow on the URLs specified in the system properties in the first step. A workflow is typically an application that is initiated by a specified role and is later moved through specific tasks assigned to different roles in different offices. Order of tasks related to an application can be forward, backward, diverging or converging, as described above.

At first, the system authenticates each user with Lightweight Directory Access Protocol (LDAP) authentication or any other authentication system later customized. After authentication, the system displays the: (1) User detail; (2) Application(s) the user is responsible for, along with his role in the application; and (3) Option to start a new workflow. By default, the system provides every user the option to start a new workflow. However, this can be customized to limit only specific or desired users.

The signed-in user can now open the application he is responsible for, to see the currently active task(s) related to the application. If any of the active task(s) belong to him, he will be able to see an Open link, otherwise he will be able to see Waiting text along with the name of the user for which the task is active. Also, at this stage, he can view the action history of the application as well. This history includes all Task Names, Names of the Person assigned with their role and the time of the Actions, along with the duration in days and hours each person took to complete the tasks in this application.

If the active task belongs to the signed-in user, he/she can click on the Open link to open the electronic application. The electronic Application has menu items on the left side. Each menu item corresponds to a form. Clicking on the menu item opens the form. If the form is necessary to be filled for the completion of the task then a Save button will appear at the bottom of the form. Otherwise, it will not appear.

The last menu item is Action. Clicking on the Action menu item opens a checkout form that shows the checklist of Forms necessary to complete the task and their status (complete/incomplete). The checkout form also has the list of actions that a user can take on this specific task. Some actions, such as Return and Save, do not require the checklist of Forms to be completed. Actions such as Forward require all necessary forms to be completed. Performing a Forward or Return action opens a compose e-mail control with a "Confirm Selected" Action button. The e-mail has the editable text for requesting action after the application is returned or forwarded. As the task is forwarded or returned, the e-mail is sent to the user responsible for the next task. This concludes the current user's active task. After forwarding or returning the application, the user can no longer access the forms in the application. However, the user will be able to see the changing history of tasks on the application.

As shown in FIG. 3, the system 300 is designed with a Layered Architecture defining three different logical layers. The bottom-most layer is the DBMS layer 302, followed by Data Access Layer 308 and finally the Webpage Layer 314. The first layer is the DBMS layer 302, which includes Tables 304 and Views 306. Above DBMS layer 302 is the Data Access Layer 308 (DAL), which includes objects and queries. All the SQL queries are in the DAL 308. The DAL 308 has 7 files in workflow automation system 300. Web pages layer 314 is disposed over the DAL 308. Web pages layer 314 includes Forms 318, Master pages 320 and Controls 316.

In the DBMS layer 302, the raw data is stored in the form of tables 304. Apart from this, in order to increase the ease of accessing and avoiding complex queries on the Data Access layer 308, Views 306 over some of the tables 304 are also stored in DBMS layer 302. Constraints, such as primary key, foreign key, and the like, are stored along with the tables 304 in DBMS layer 302.

The Data Access layer 308 includes Data Access Layer files having extension ".xsd". These files contain objects for accessing one or more tables 304 or views 306 in Database layer 302. Each object is linked with the Data in the DBMS 302 through a connection string, which is stored in a configuration file on the web server 105. The connection string contains the name of the Data source (server name), the initial catalog (Database name), user ID and password. Along with the connection string, the provider name is also stored. In the usual practice, one object is linked with one table or view. The object contains the attributes of the table or view and the queries that will be used to access the data.

Figure 4:
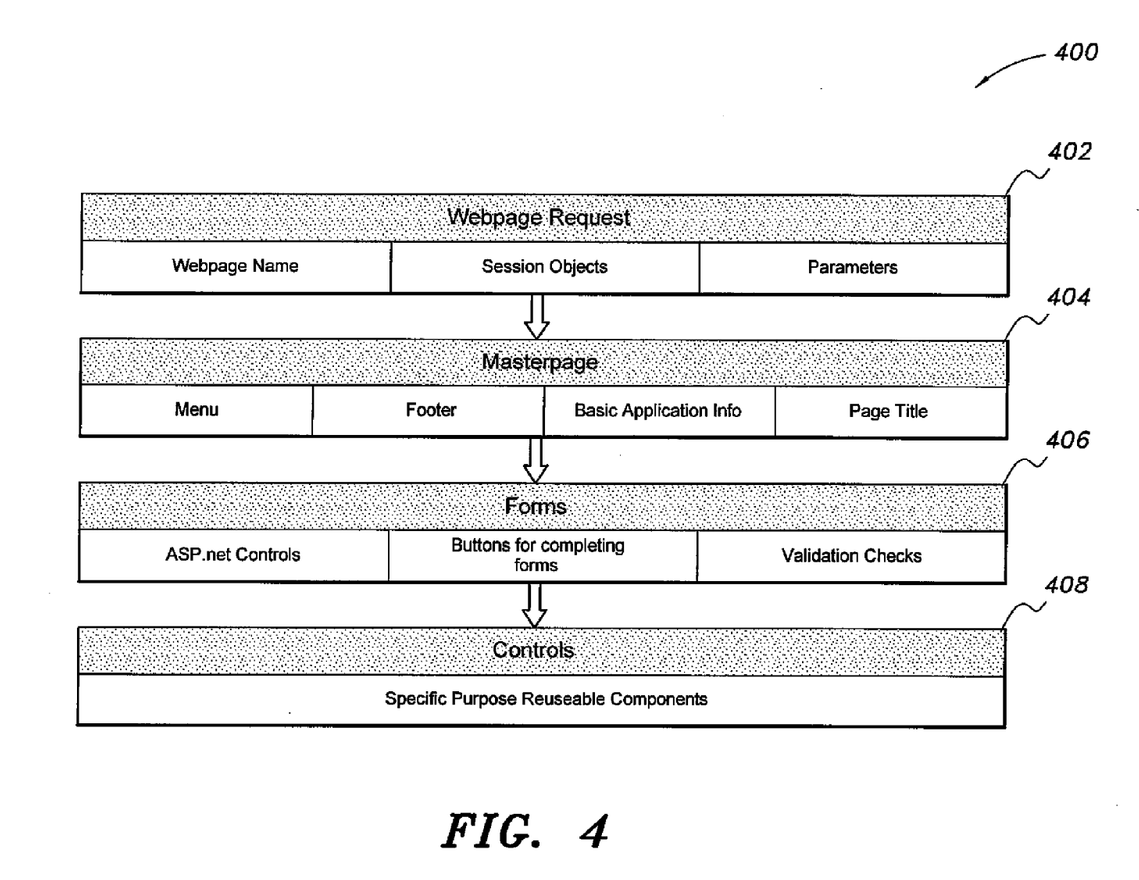
FIG. 4 is a flow diagram showing the usual route of a web page request in a workflow automation system according to the present invention.

The web page layer 314 receives the data manipulation requests from the user or the system and shows the results of the actions. The web pages use the objects of the DAL 308 to form Adapters. The Adapters allow the web page to access the query methods of the Objects. Operational flow 400 of the web page layer 314 is shown in FIG. 4 where it can be observed that a web page request 402 results in master page presentation 404 to the end user who then selects from a menu in order to proceed to the forms presentation 406. The user then clicks on buttons for completing forms, which results in specific controls presentation 408. All of the aforementioned presentations to the end user are determined according to the business logic specified by the administrator. The following code shows how the adapter object is formed (first line) and how the Adapter is used to extract data using the GetApplicant method that contains the query:

TABLE 2

Adapter Object code

```
PromotionTableAdapters.EmpTableAdapter adapter=new
PromotionTableAdapters.EmpTableAdapter( );
Promotion.EmpDataTable table = adapter.GetApplicant(applicationID);
```

The Workflow Automation system includes a front end design and a Back end Database Design. In the front end design, the WebPages include reusable components known as user defined controls. As shown in FIG. 4 a web request is routed from the web server 105 and finally reaches the controls at the end. As a web page is requested by the server 105, the master page 320, along with the form and controls are made in the order shown in FIG. 4.

There are 43 Database Tables 304. The tables are grouped into 7 classes depending upon the data and its usage in the system. These include Workflow Tables, which are mainly responsible for maintaining workflow from one task to the other. Within the Workflow tables are static tables, which define the main workflow of the application. Definitions of the course of action, privileges, instructions, etc., are included in the static tables.

TABLE 3

Description of Static Workflow Tables

| Static Workflow Tables | Description |
| --- | --- |
| Action | All the actions that a role can be performed with respect to the task assigned are stored here. |
| ActionMessage | The template of the message that becomes the contents of the e-mail when a new task is started. The e-mail is sent to the role responsible for the task and will also appear as the role opens the application. |
| Form | All the ASP.NET Forms and their titles are stored here. These titles are used for menu generation. |
| Phase | In case of parallel processes, the task is overlooked by the Phase. The Phase ID and Title are stored here. |
| Role | The Role represents the different categories of faculty, e.g., Applicant, Chairman, Dean, etc. |
| Task | All the tasks with corresponding Role and Phase (in case of parallel processes) are stored here. Also the number of days the system will wait for sending the first and subsequent reminders if the task is not completed are also stored corresponding to each task. |
| TaskForm | Information of which forms are shown for each task and which forms are necessary to complete in order to complete the task is stored here. |

Additionally, the workflow tables include dynamic tables, which are prefixed with "Application_". The data in these tables are dynamically changed as the application is moved from one role to the other or a task is being completed.

TABLE 4

Description of Dynamic Workflow Tables

| Dynamic Workflow Tables | Description |
| --- | --- |
| Application | This table corresponds to one application or project that is comprised of different tasks. |
| Application_Role | This table stores the role corresponding to an application. The role is determined by the employee ID |
| Application_TaskForm | The information regarding each task in an application. Which form is to be shown in which task and what instructions should be displayed on the page/form. |
| Application_Log | This TABLE 1s used for building history. It stores all the events. |
| Application_TaskLog | This table specifies whether the task is completed or not. |

With respect to First Level Form Tables, all the forms have direct links with the First Level Form tables through Data Access layer 308. All these tables are prefixed with "Form_".

With respect to Second Level Form Tables, these tables are directly linked with the First Level Form Tables. Forms do not access these tables directly.

The Human Resource Tables are static tables that are synchronized with the Human Resource Database of the company. These tables include Employee Detail and department organization as discussed in the preliminaries. Report parameters are fetched from the Report Parameters TABLE in the forms with report control. The TABLE is prefixed with "Report". The parameters are used in the reports and their values present in the table to allow the items in the reports to be shown or to be hidden. This allows small chunks of information to be hidden from specific roles.

With the help of the above mentioned tables and SQL queries that run over them, the system is designed in such a way that only the desired user(s) at a time can access and open the application. All the other Application roles are shown the application in a waiting state with the name of the person the task is assigned to. All roles can witness the action tracking of the application by opening the application's active task. Also, with the help of some complex queries, the rules are made for forwarding and returning the application to one or more recipients quite easily by changing the Action and Task table with the help of Forms available. This relieves the developers from the necessity of writing complex queries.

The workflow automation system provides a framework for building automation of businesses and primitive paper-based systems. It helps in managing information, as well as providing reports for the high-level authorities for critical business decision.

An engine or framework for automating the workflows in businesses or offices is presented. The Workflow Automation system 300 provides developers an easy and user-friendly environment for developing complex workflows without any need of writing complex queries in a minimal amount of time. With some definite steps of customization, the workflow skeleton is ready to run, providing each role a secure login on a web-based system. The Forms for each role can be made using the available ASP.net and C# forms and control templates for defining specific task of each user, i.e., what to do when and by whom.

The advanced features of the system 300 include automatic sending of e-mail reminders to complete tasks, Application tracking, Processing of Parallel and Sequential Tasks, Easy concealment of certain role names from others, Easy method to provide Instructions on each web page, and the like.

Figure 6:
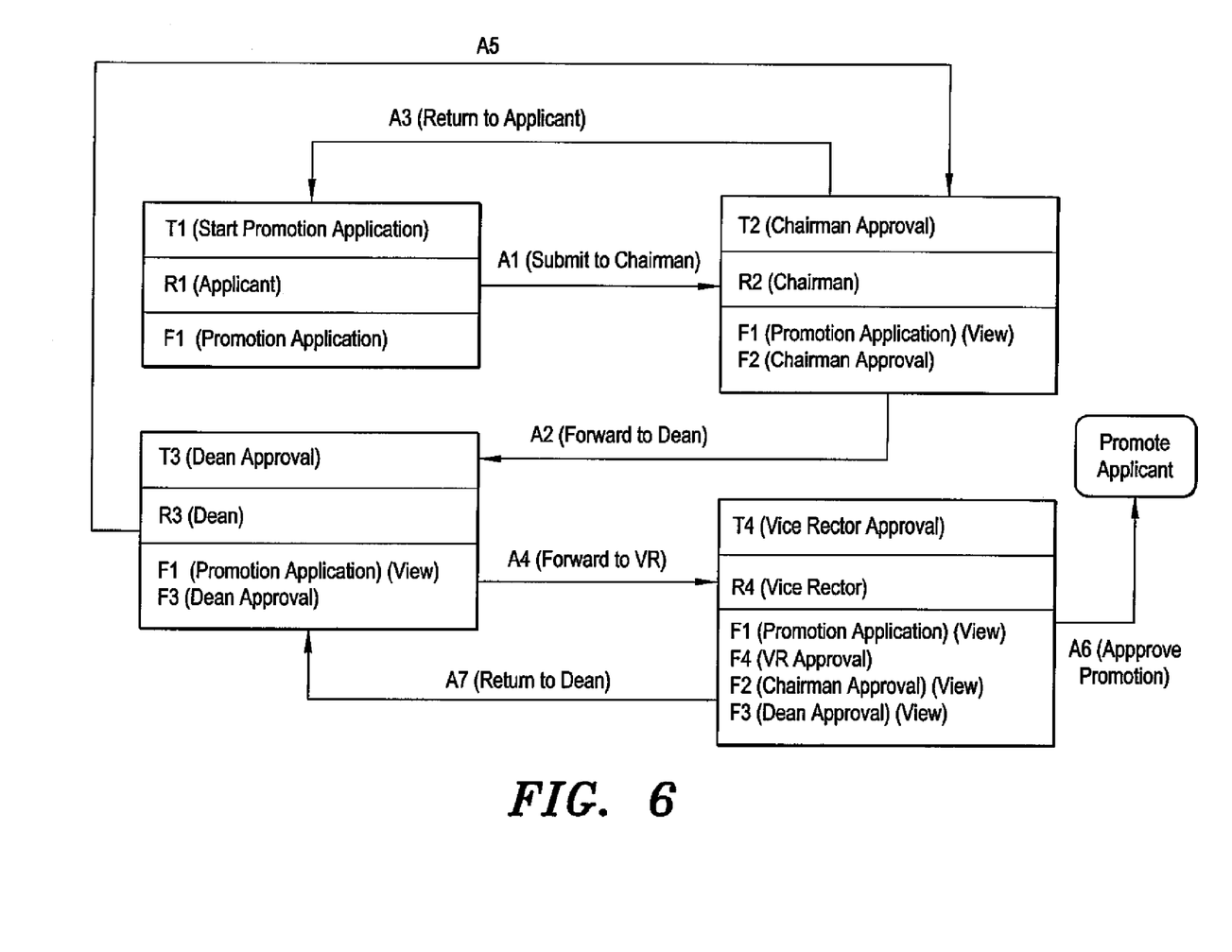
FIG. 6 is a flowchart illustrating the workflow automation system applied to an exemplary application of faculty promotion.

FIG. 6 illustrates the system 300 being used for the exemplary application of faculty promotion within a university or similar academic environment. In the example of FIG. 6, the system 300 is used as an online system for aiding university faculty to apply for promotions within their departments or within the university. Conventionally, faculty members typically apply for promotion, and the department Chairman approves and forwards the application to the college or university Dean. The Dean provides his comments and forwards the application to the Vice Rector (VR). The Vice Rector makes the decision regarding promotion on the basis of the comments and approval from Chairman and Dean. The promotion application can be routed back and forth between the various parties at any stage. Typically, the Dean cannot forward the application without the approval of the Chairman, and the Vice Rector cannot make any decision without the approval of the Dean and the Chairman.

Using the system 300 as an online faculty promotion system allows the user to apply for promotion, upload and view documents, digitally sign documents, enter comments, and easily route the application back and forth through the defined stages. Further, any change in the workflow can be accommodated. For example, if the acceptance from the Rector is to be involved in the workflow, the system 300 will accept such changes at run time without any additional programmer support.

As noted above, the system 300 makes use of specialized and customizable forms. For the particular application of faculty promotion, as shown in FIG. 6, the forms include the initial promotion application submitted by the applicant faculty member (form F1), the form for Chairman approval (form F2), the form for Dean approval (form F3), and the form for Vice Rector approval (form F4). As described above with regard to the general functioning of the system 300, the workflow must be defined in terms of Tasks, Roles, Actions, and Forms. The output of the system 300 is an automation that allows users to login to a website that has a predefined database at the back end. All of the roles are given the defined access. Proper user, task, and role management is accomplished in this automation. The first step in developing the automation is to identify the Tasks, Roles, Actions, and Forms. The four forms used in the faculty promotion application are defined above. The tasks, as illustrated sequentially in the flow diagram of FIG. 6, are: starting the promotion application (task T1), approval by the Chairman (task T2), approval by the Dean (task T3), and approval by the Vice Rector (task T4). The identified roles are the applicant (role R1), the Chairman (role R2), the Dean (role R3), and the Vice Rector (role R4). As described above with regard to general operation of system 300, the roles are defined by distinct role names, such as "Applicant", "Chairman", etc. Each role is given a unique role ID by the system 300. When defining a particular task, a task name is input into the system 300, along with the role responsible for the task and the number of days required to complete the task, along with initial start days and periods after which a reminder should be issued.

As shown in FIG. 6, the applicant R1 starts the promotion application (task T1) using the initial promotion application (form F1). The first identified action A1 is submission of form F1 to the Chairman R2. The Chairman R2 views the first form F1, approves the form (second task T2), and generates the second form F2, indicating approval by the Chairman R2. The first form F1 and the second form F2 are then forwarded to the Dean R3 as the second action A2. The Dean's approval is the third task T3, and the Dean R3 generates a third form F3, indicating his approval.

As noted above, when defining forms in the system 300, the name of the ".aspx" file is entered, along with its title. The task form table defines the forms available for a particular task. A field referred to as "LEVEL" is present in this table. The value in this field sets the privilege of the user opening the form. For example, if the value is "0", then this form will be available for editing for the role with role ID of "0" and will be available for viewing by all other roles. "INSTRUCTION" and "CHECKABLE" are additional fields. The "INSTRUCTION" field allows the user to view operating instructions of the form when the form is opened. The "CHECKABLE" field is a yes/no field, which denotes whether or not the form is necessary for the task to be completed. A fourth field, "RANK", places the form title in the left menu.

Returning to the workflow of FIG. 6, the fourth action A4 is forwarding of forms F1, F2 and F3 to the Vice Rector (VR), who is identified as the fourth and final role R4. The Vice Rector's approval is the fourth and final task T4. If the Vice Rector approves the promotion, the Vice Rector R4 generates an approval form F4 approving the applicant R1 (action A6), or the Vice Rector R4 may decide not to approve the applicant for promotion, returning the forms F1-F3 back to the Dean R3 (action A7).

Initially, as described above, when the applicant R1 generates the form F1, the form F1 is editable and customizable, and may include any desired information. When the applicant R1 submits the application to the Chairman R2, he will not be able to make any changes to form F1 unless the Chairman returns the application back to the applicant. The same is true with the Chairman R2; i.e., the Chairman R2 can view the promotion application F1 in view mode, enter his comments in the Chairman's approval form F2, and make a decision of approval or disapproval by selecting the appropriate actions of either forwarding form F2 to the Dean R3 (action A2) or returning form F1 to the applicant (action A3). The Chairman R2 can edit his comments as long as the application F1 is not forwarded or returned. Similarly, the Dean R3 can view the application in form F1 in a view mode and can enter his comments in the Dean's approval form F3, and can make a decision of approval or disapproval by selecting the appropriate actions of forwarding to the Vice Rector R4 (action A4) or returning form F3 to Chairman R3 (action A5). The Vice Rector R4 can view the approval comments of the Dean and the Chairman and enter his comments in the VR approval form F4. He can then finish the application by either promoting the applicant (action A6) or returning forms F1-F3 to the Dean (action A7).

As the promotion application moves from one task to another, e-mail is sent to the next task holder describing work he is supposed to do. All of the users are shown the tracking information on their login. The user to whom the task is assigned is automatically reminded by the system after the number of days defined while defining the task.

As described above with regard to the general functioning of the system 300, when defining actions, an action name is provided along with the associated task, the next task, and the reminder e-mail template. The e-mail template has variables, such as "@@Sender@@", "@@receiver@@", "@@Dept@@", etc. These variables are filled with proper values in an e-mail and shown to the user while an action is being performed by a user in a task. The same e-mail will be sent as reminders if the task is not finished in the specified number of days.

Once the workflow is defined in the system 300, the next step is to populate the table of employees in the database. The employee table consists of the following columns: Employee ID, Title, Name, Department, College, and e-mail ID. The Employee ID is a numeric field which can represent currently used ID within the university. The Title is a typical title, such as "Dr.", "Mr." or the like. Preferably, the e-mail ID is entered without the domain name, since an established e-mail system in the organization is one of the requirements of the system 300.

A department manager table is also assembled and stored in the database. This table is meant for introducing a hierarchy of departments into the system. The fields available are Role ID, Department, Employee ID, Deputy Employee ID and Deputy Email. The Role ID is the role of all managerial users, excluding the applicant (i.e., the user with the lowest position in the hierarchy). Employee IDs are the Employee IDs for each member of the hierarchy (Dean, Chairman, Vice Rector, etc.). The Deputy Employee ID is the ID of the person who will take the place of the Dean, Chairman, etc. if they are not available.

The final table to be generated and stored in the database is the system information table, which includes the following fields: System Full Name, System Short Name, and System URL. In the present example, the System Full Name may be called "Faculty Promotion System", for example. The System Short Name is a short name that is used as an e-mail address. The e-mail address is used for sending e-mail and reminders to the task holders. The System URL is the web address where the system is to be uploaded.

Editing the workflow in the system 300 is relatively easy. In the faculty promotion example of FIG. 6, if a new role of Rector is to be added after the Vice Rector, this may be accomplished simply by defining a new Role called "Rector"; defining a new task called "Rector Approval"; editing action A6 such that the next task becomes the "Rector Approval" task instead of promotion of the applicant (and editing the e-mail template accordingly); defining the actions for the Rector Approval task, such as returning to the Vice Rector and approval of the promotion; generating the form for Rector Approval comments with the available form templates; and making entries in the task form table to have forms available for the Rector Approval task.

If forms privileges need to be revised, this may be accomplished by changing records in the task form table at any time. For example, in order to set the view-only mode of the Chairman Approval form F2 available in the Dean Approval task, the user only needs to insert a new record in the task form table. The user then selects the task name (T3), and the form name (F2) from the available dropdown menus. The user then sets a suitable Rank that will make the form title appear in the task holder's menu. The level is then set to "1" so that the form is opened in view-only mode. Any instructions are given, if needed, and the checkable field is set to "no", so that no entry in this form is required. When the Dean opens the application, he will be able to see the menu on the left with the Chairman Approval form. Clicking on this will open the Chairman Approval form in view-only mode.

It is to be understood that the present invention is not limited to the embodiments described above, but encompasses any and all embodiments within the scope of the following claims.

We claim:

1. A workflow automation system, comprising:
a plurality of databases holding workflow tables maintaining workflow for a plurality of tasks, the workflow tables including static tables defining the main workflow of an application, the static tables having definitions of course of action, orders of tasks to be performed, privileges, and instructions stored therein;
a database management system managing the plurality of databases;
dynamic web pages;
a server computer hosting the database management system and the dynamic web pages, the server computer having means for accessing a network and means for publishing a web site on the network, the web site being accessible to end user client devices and administrator client devices, thereby allowing an administrator access to the server and allowing an end user access to the dynamic web pages;
means for administrator access to the database management system, the means for administrator access including means for allowing the administrator to define business logic of the workflows and the tasks;
means for establishing a database management system layer managing views and the workflow tables;
means for establishing a Data Access layer managing objects and queries related to the workflow tables and the views, the Data Access layer being in operable communication with the database management layer;
means for establishing, a Web page layer managing controls, forms and master pages, the Web page layer being in operable communication with the Data Access layer;
means for defining properties of the workflow automation system;
means for defining all roles/user classes involved in the workflow automation system, the roles/user classes including an applicant for faculty promotion, a department chairman, a dean, and a vice rector;
means for defining all phases for parallel execution of a task, each of the phases being defined by a Phase ID and Phase Title, parallel executing tasks having identical Phase IDs;
means for defining all tasks involved in the workflow, wherein each of the tasks is assigned a Task ID, a Phase ID, a Task Title, the Role ID of the role the task is assigned to, a first reminder duration, and subsequent reminder durations, each of the tasks being user-customizable to a particular field of work of the workflow, the tasks including:
generation of an initial promotion application form;
generation of a chairman approval form upon approval of the initial promotion application form by the chairman;
generation of a dean approval form upon approval of the initial promotion application form and the chairman approval form by the dean; and
generation of a vice rector approval form upon approval of the initial promotion application form, the chairman approval form, and the dean approval form by the vice rector;
means for defining actions related to each of the tasks, every action related to a particular task being defined by an Action ID, Action Title, Action Type, Task ID of the task holding the action, and a next Task ID/Phase ID, depending on whether the action is to fork into more than one parallel task;
means for defining forms used in the workflow automation system, each of the forms being defined by a Form ID, title of page, and name of form, the static tables including a forms table, the forms and the titles thereof being stored in the forms table, the titles being used for menu generation, each of the forms being user-customizable to the particular field of work of the workflow, the forms including the initial promotion application form, the chairman approval form, the dean approval form and the vice rector approval form;
means for defining forms related to each of the tasks, wherein each of the tasks has a set of forms assigned to selected ones of the roles present in the system, each of the forms being non-editable following transmission of the form from the role/user who generated the form to the role/user who receives the form; and
means for defining e-mail templates for each of the action after completion of the corresponding task, wherein an e-mail is sent to the role associated with a successor task upon completion of the immediate task, the e-mail template being defined by an Action ID, a next Task ID, and a message;
wherein the end user can interact with the dynamic web pages according to the workflow and task business logic defined by the administrator.

2. The workflow automation system according to claim 1, further comprising means for automatically sending e-mail reminders to complete tasks after preselected administrator-defined intervals.

3. The workflow automation system according to claim 1, further comprising means for establishing a web application framework allowing the administrator to rapidly design and deploy said dynamic web pages according to the business logic.

4. The workflow automation system according to claim 3, wherein the web application framework includes means for allowing forms to be made using available templates for specifically defining a task depending on a class of end user.

5. The workflow automation system according to claim 1, further comprising means for customizing name of the system, task names, role names, names of actions on each task, and the order of tasks.

6. The workflow automation system according to claim 1, further comprising means for providing a secure login for all classes of end users.

7. The workflow automation system according to claim 1, further comprising means for tracking objects in the workflow.

8. The workflow automation system according to claim 1, further comprising means for parallel and sequential task processing.

9. The workflow automation system according to claim 1, further comprising means for concealment of certain classes of users from other classes of users, wherein only relevant information according to user class is shown to the users.

10. The workflow automation system according to claim 1, further comprising means for allowing users to see tracking information of all said tasks present in said workflow, with task names, person name, and role name and the time of action along with the duration each role is taking.

11. The workflow automation system according to claim 1, further comprising means for providing an action history recording action on said dynamic web pages taken by said end users, names of persons performing said action being selectively hidden from administrator defined classes of said end users.

12. The workflow automation system according to claim 1, wherein the workflow tables further include dynamic tables, the dynamic tables being dynamically changed as the workflow moves from one role to another role and as a task is being completed.

13. A computerized workflow automation method, comprising the steps of:
defining properties of a workflow automation system;
establishing a plurality of databases holding workflow tables maintaining workflow for a plurality of tasks, the workflow tables including static tables defining the main workflow of an application;
providing a database management system for managing the plurality of databases;
establishing dynamic web pages;
providing a server computer for hosting the database management system;
establishing a network connection for publishing a web site on a network such that the web site is accessible to end user client devices and administrator client devices, thereby allowing an administrator access to the server computer and allowing an end user access to the dynamic web pages;
defining business logic of workflows and tasks, wherein the definition of the workflows and the tasks is performed by the administrator;
establishing a database management system layer for managing views and the workflow tables;
establishing a Data Access layer managing objects and queries related to the workflow tables and the views, the Data Access layer being in operable communication with the database management system layer;
establishing a Web page layer managing controls, forms and master pages, the Web page layer being in operable communication with the Data Access layer;
storing definitions of course of action, privileges and instructions in the static tables;
defining all roles/user classes, involved in the workflow automation system, the roles/user classes including an applicant for faculty promotion, a department chairman, a dean and a vice rector;
defining all phases for parallel execution of a task, each of the phases being defined by a Phase ID and Phase Title, parallel executing tasks having identical Phase IDs;
defining all tasks involved in the workflow, each of the tasks being assigned a Task ID, a Phase ID, a Task Title, a Role ID of the role the task is assigned to, a first reminder duration, and subsequent reminder durations, the step of defining the tasks being user-customizable to a particular field of work of the workflow, the tasks including generation of an initial promotion application form, generation of a chairman approval form upon approval of the initial promotion application form by the chairman, generation of a dean approval form upon approval of the initial promotion application form and the chairman approval form by the dean, and generation of a vice rector approval form upon approval of the initial promotion application form, the chairman approval form, and the dean approval form by the vice rector;
defining actions related to each of the tasks, every action related to a particular task being defined by an Action ID, Action Title, Action Type, Task ID of the task holding the action, and, a next Task ID/Phase ID depending on whether the action is to fork into more than one parallel task;
defining forms used in the workflow automation system, each of the forms being defined by a Form ID, title of page, and name of form, the step of defining the forms being user-customizable to the particular field of work of the workflow, the forms including the initial promotion application form, the chairman approval form, the dean approval form and the vice rector approval form;
establishing a forms table in the static tables;
storing the forms and titles thereof in the forms table;
defining forms related to each of the tasks, each of the tasks having a set of the forms assigned to a selected one of the roles present in the system, each of the forms being non-editable following transmission of the form from the role/user who generated the form to the role/user who receives the form;
defining e-mail templates for each of the actions after completion of the corresponding task, an e-mail being sent to the role associated with a successor task upon completion of the immediate task, the e-mail template being defined by an Action ID, a next Task ID, and a message,
wherein the end user can interact with the dynamic web pages according to the workflow and task business logic defined by the administrator.

14. A computer software product for workflow automation, the product comprising a non-transitory storage medium readable by a computer, the non-transitory storage medium having a set of computer-readable instructions stored thereon executable by a processor when loaded into main memory, the instructions including:

a first set of instructions that, when loaded into main memory and executed by the processor, cause the processor to define properties of said workflow automation system;

a second set of instructions that, when loaded into main memory and executed by the processor, cause the processor to establish dynamic web pages;

a third set of instructions that, when loaded into main memory and executed by the processor, cause the processor to establish a network connection for publishing a web site on a network such that the web site is accessible to end user client devices and administrator client devices, thereby allowing an administrator access to a server computer and allowing an end user access to the dynamic web pages;

a fourth set of instructions that, when loaded into main memory and executed by the processor, cause the processor to define business logic of workflows and tasks, wherein the definition of the workflows and the tasks is performed by the administrator;

a fifth set of instructions that, when loaded into main memory and executed by the processor, cause the processor to establish a database management system layer for managing views and the workflow tables;

a sixth set of instructions that, when loaded into main memory and executed by the processor, cause the processor to establish a Data Access layer managing objects and queries related to the workflow tables and the views, the Data Access layer being in operable communication with the database management system layer;

a seventh set of instructions that, when loaded into main memory and executed by the processor, cause the processor to establish a Web page layer managing controls, forms and master pages, the Web page layer being in operable communication with the Data Access layer;

an eighth set of instructions that, when loaded into main memory and executed by the processor, cause the processor to define all roles/user classes, involved in said workflow automation system, wherein the roles/user classes include an applicant for faculty promotion, a department chairman, a dean and a vice rector;

a ninth set of instructions that, when loaded into main memory and executed by the processor, cause the processor to define all phases for parallel execution of a task, each of said phases being defined by a Phase ID and Phase Title, parallel executing tasks having a same Phase ID;

a tenth set of instructions that, when loaded into main memory and executed by the processor, cause the processor to define all tasks involved in said workflow, wherein each task is assigned a Task ID, a Phase ID, a Task Title, said Role ID of said role said task is assigned to, a first reminder duration, and subsequent reminder durations, the definition of each said task being user-customizable to a particular field of work of the workflow, wherein the tasks include generation of an initial promotion application form, generation of a chairman approval form upon approval of the initial promotion application form by the chairman, generation of a dean approval form upon approval of the initial promotion application form and the chairman approval form by the dean, and generation of a vice rector approval form upon approval of the initial promotion application form, the chairman approval form, and the dean approval form by the vice rector;

an eleventh set of instructions that, when loaded into main memory and executed by the processor, cause the processor to define actions related to each task, every action related to a task being defined by an Action ID, Action Title, Action Type, Task ID of the task holding the action, and, a next Task ID/Phase ID depending on whether the action is to fork into more than one parallel task;

a twelfth set of instructions that, when loaded into main memory and executed by the processor, cause the processor to define forms used in the workflow automation system, wherein each form is defined by a Form ID, title of page, and name of form, the definition of each said form being user-customizable to a particular field of work of the workflow, wherein the forms include the initial promotion application form, the chairman approval form, the dean approval form and the vice rector approval form;

a thirteenth set of instructions that, when loaded into main memory and executed by the processor, cause the processor to define forms related to each task, wherein a task is a set of forms assigned to a role present in the system, wherein each said form is non-editable following transmission of the form from the role/user who generated the form to role/user who receives the form;

a fourteenth set of instructions that, when loaded into main memory and executed by the processor, cause the processor to define e-mail templates for each action after task completion, wherein an e-mail is sent to a role associated with a successor task upon completion of the immediate task, said e-mail template being defined by an Action ID, a next Task ID, and a message;

a fifteenth set of instructions that, when loaded into main memory and executed by the processor, cause the processor to provide a method to provide instructions on each webpage by the Administrator;

a sixteenth set of instructions that, when loaded into main memory and executed by the processor, cause the processor to establish a plurality of databases holding workflow tables maintaining workflow for a plurality of tasks, wherein the workflow tables include static tables defining the main workflow of an application;

a seventeenth set of instructions that, when loaded into main memory and executed by the processor, cause the processor to store definitions of course of action, orders of tasks to be performed, privileges and instructions in the static tables;

an eighteenth set of instructions that, when loaded into main memory and executed by the processor, cause the processor to establish a forms table in the static tables; and a nineteenth set of instructions that, when loaded into main memory and executed by the processor, cause the processor to store the forms and titles thereof in the forms table, wherein the end user can interact with the dynamic web pages according to the workflow and task business logic defined by the administrator.

* * * * *